June 4, 1963 R. L. WATTERS 3,092,784

SQUELCH CIRCUIT

Filed Nov. 28, 1960

Inventor:
Robert L. Watters,
by Joseph V. Claeys
His Attorney.

United States Patent Office 3,092,784
Patented June 4, 1963

3,092,784

SQUELCH CIRCUIT

Robert L. Watters, Schenectady, N.Y., assignor to General Electric Company, a corporation of New York Filed Nov. 28, 1960, Ser. No. 71,970
6 Claims. (Cl. 330—145)

Figures 1, 2, 3, 4, 5, 6:
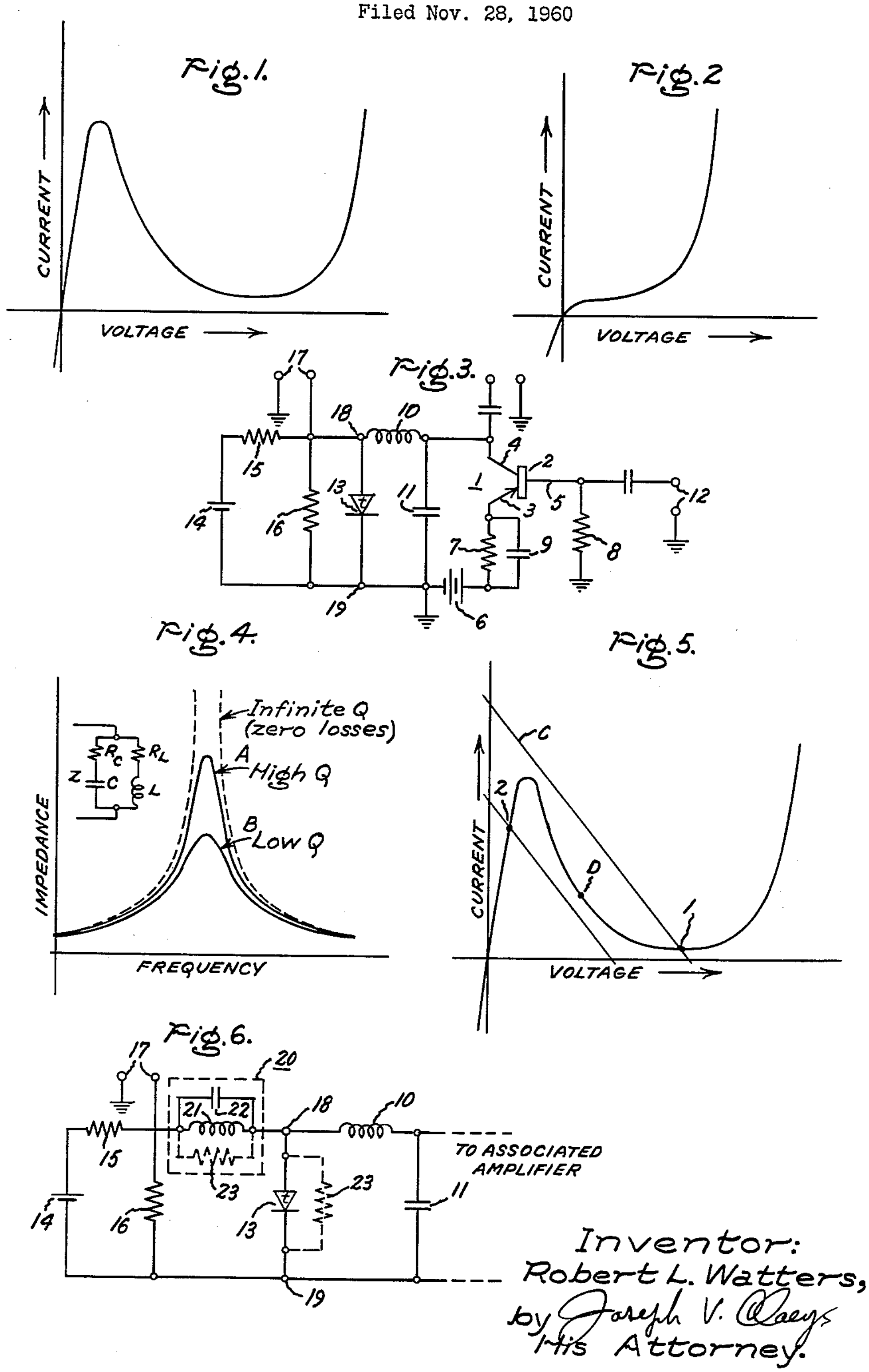

This invention relates to squelch circuits for receivers of carrier waves.

Squelch circuits of many and varied types and complexity are known in the art to suppress noise in the output of signal receivers when no carrier signal is present. Such noise may be present and objectionable, for example, when an operator tunes the receiver from one station to another or when listening for a station not "on the air." The latter situation, in particular, is one of great importance from the standpoint of contributing significantly to operator fatigue, for example, with communication receivers for both civil and military uses. Many prior art squelch circuits are complex and often incorporate mechanical relays. In addition, many prior art squelch circuits of the type which vary the bias on an amplifying device are not particularly satisfactory when the incoming carrier signals are weak. This results in an area of indecision in which the receiver alternately shifts "in" and "out" causing an objectionable amount of intermittent noise.

It is an object of this invention, therefore, to provide a new squelch circuit which substantially avoids one or more of the limitations and disadvantages of the prior art circuits described above.

It is another object of this invention to provide a squelch circuit having no area of indecision and which is equally reliable under extremely weak as well as extremely strong signal conditions.

It is another object of this invention to provide a squelch circuit wherein an abrupt switching action increases the gain of an associated amplifier whenever the selected carrier signal exceeds a first predetermined value and decreases the gain thereof whenever the carrier signal falls below a second predetermined value.

It is still another object of this invention to provide a squelch circuit utilizing no mechanical components and one which offers greater circuit simplicity and saving in circuit components than prior art squelch circuits.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing in which:

FIGS. 1 and 2 are typical current-voltage characteristics of different tunnel diode devices suitable for use in the practice of this invention, FIG. 3 is a schematic diagram of one form of the squelch circuit of this invention, FIG. 4 illustrates the impedance-frequency characteristic of a parallel resonant circuit, FIG. 5 is a typical negative resistance tunnel diode current-voltage characteristic illustrating a suitable direct current load line; and, FIG. 6 is a schematic circuit diagram of another embodiment of this invention.

Briefly stated, in accordance with one aspect of this invention, a squelch circuit for a receiver of carrier waves comprises a parallel resonant circuit, resonant to a selected frequency and a tunnel diode device, capable of operation in a high and a low impedance condition, in series circuit therewith. Means are provided in circuit with the tunnel diode to bias the diode in its high impedance condition causing the amplification characteristics of the parallel resonant circuit to be low. A control signal, representative of an incoming carrier signal, is applied to the tunnel diode device to cause the operating condition thereof to be abruptly changed from the high impedance condition to a low impedance condition. The resulting change in impedance, in series with the resonant circuit, to the lower value increases the amplification characteristics of the resonant circuit.

Whenever the incoming carrier is below a predetermined threshold value, therefore, the operating condition of the tunnel diode remains in a high impedance operating condition causing the amplification characteristics of the parallel resonant circuit to be low. When this threshold value is exceeded, however, the tunnel diode device is caused to switch to a low impedance condition increasing the amplification characteristics of the parallel resonant circuit. The tunnel diode device remains in the low impedance condition until the incoming carrier falls to a level below that necessary to produce a control signal sufficiently strong to maintain the net bias on the tunnel diode below its switching point. When the parallel resonant circuit is the load circuit of an amplifier stage the gain thereof is increased or decreased in response to the increase or decrease in the amplification characteristics of the resonant load circuit.

The active circuit element utilized in the practice of this invention is of the type referred to in the art as a "tunnel diode device." Such devices, well-known in the art, are two-terminal devices comprising a space charge region less than approximately 200 angstrom units wide such that the current-voltage characteristic of the device is determined primarily by the quantum mechanical tunneling process. One widely known tunnel diode device having a typical current-voltage characteristic such as shown in FIG. 1 comprises a narrow P-N junction space charge region formed between degenerate P-type and degenerate N-type conductivity semiconductive material. As shown in FIG. 1 such a device exhibits a region of strong negative resistance in the low forward voltage range of its current-voltage characteristic. Other tunnel diode devices including those comprising such a narrow P-N junction formed between two similar semiconductive materials, between two dissimilar semiconductive materials or devices fabricated from alternate metal-insulator-metal layers may exhibit only a very weak negative resistance region or even none at all. As, for example, the tunnel diode device having a current-voltage characteristic such as illustrated in FIG. 2 and often termed in the art a "backward diode."

As used throughout the specification and in the appended claims, therefore, the term "tunnel diode device" is used to denominate a device comprising a narrow space charge region, less than approximately 200 angstrom units wide, such that the current-voltage characteristic of the device is determined primarily by the quantum mechanical tunneling process and which may or may not exhibit a negative resistance. Further details of tunnel diode devices may be had by reference to the booklet, entitled "Tunnel Diodes," published in November 1959 by Research Information Services, General Electric Company, Schenectady, New York.

FIG. 3 illustrates the present invention embodied in an amplifier stage which may be, for example, a conventional transistor type amplifier generally designated at 1. Amplifier stage 1 may be, for example, one of the radio-frequency or intermediate-frequency stages of a superheterodyne type receiver of carrier signals. Amplifier stage 1 includes transistor 2 having emitter electrode 3, collector electrode 4 and base electrode 5. Suitable biasing potentials are applied to the emitter, collector and base electrodes in a conventional manner and may be, for example, as illustrated schematically by voltage source 6 and resistances 7 and 8 respectively. Capacitance 9 across resistance 7 is a by-pass for signal frequencies. The collector electrode 4 and emitter electrode 3 are connected across a resonant load circuit which may be, for example, the parallel combination of inductance 10 and capacitance 11. The combination of inductance 10 and capacitance 11 comprises a parallel resonant circuit, resonant to the frequency of a selected signal impressed on the input of the amplifier stage, as at terminals 12 thereof. For example, when the amplifier 1 is a radio-frequency amplifier stage, the resonant frequency is made substantially the same as that of the selected carrier signal. When amplifier 1, however, is one of the intermediate-frequency amplifier stages, the resonant load circuit is made resonant to the intermediate-frequency of the receiver.

In accordance with the present invention, a tunnel diode device 13, capable of operation in a high and a low impedance condition, is connected in series circuit with the resonant load circuit of the amplifier stage 1. As shown in FIG. 3, for example, tunnel diode device 13 is connected from one end of inductance 10 to the other side of the circuit. A bias means, including voltage source 14 and resistances 15 and 16, is connected in circuit with the tunnel diode device and provides a suitable forward voltage thereacross to assure operation in the high impedance condition. The slope of the direct current load line established by the bias means is primarily determined by the value of resistance 16. In addition, resistance 16 is selected to have a value which assures a high equivalent resistance from its parallel combination with the impedance of the tunnel diode device 13 when in the high impedance operating condition. A control signal which may, for example, be an automatic volume control signal or other signal representative of an incoming carrier signal, is applied to the tunnel diode device 13 at terminal 17.

The gain of amplifier stage 1 is dependent upon the impedance of its resonaant load circuit; being high when the impedance is high and low when the impedance is low. In operation, the gain of the amplifier stage is abruptly increased whenever an incoming carrier signal exceeds a predetermined threshold value by an abrupt change in the amplification characteristics of the resonant load circuit of amplifier stage 1. This change in gain is produced by the abrupt change of operating condition of the tunnel diode device, in series with the resonant load circuit, from a high to a low impedance condition.

"Circuit Q" is a measure of the amplification characteristics of a resonanat circuit and may be defined as the ratio of inductive reactance to circuit series resistance and may be illustrated by the relationship $$\frac{\omega L}{R}$$

The effect of the circuit resistance upon the impedance of a parallel resonant circuit may be illustrated by reference to FIG. 4, which shows the impedance of a parallel resonant circuit as a function of frequency. In addition, the effect of the circuit resistance as reflected by the relative "Q" thereof is shown by a comparison of the curves A and B which have high and low values of "Q" respectively. Increasing the series resistance of the resonant circuit, lowering the "Q" thereof, lowers and flattens the peak of the impedance curve as shown. Since, as described hereinbefore, the gain of amplifier stage 1 is related to the impedance of its resonant load circuit, a variation in the "circuit Q" thereof results in a variation in the gain of the amplifier stage.

In the operation of the circuit of FIG. 3, tunnel diode 13 is biased to provide operation in its high impedance condition in the absence of an incoming carrier signal at terminals 12. This may be illustrated by FIG. 5 showing a typical negative resistance tunnel diode current-voltage characteristic and a suitable direct current load line C to provide such operation. Load line C, established by the bias means, intersects the tunnel diode current-voltage characteristic such as at the point 1, and determines the quiescent operating condition. For example, with no incoming carrier signal at terminals 12 or an incoming carrier signal below a predetermined threshold value, the tunnel diode device 13 remains at the high impedance condition in the vicinity of the point 1.

As shown hereinbefore resistance 16 has been selected to have a value which, in parallel combination with the impedance of the tunnel diode 13 in its high impedance condition, assures a high equivalent resistance in series with the resonant load circuit of amplifier stage 1. This relatively large series resistance causes the "Q" of the resonant load circuit to be low and consequently the gain of the amplifier with which it is associated is also low. The equivalent series resistance is selected to be large enough to lower the gain of the amplifier sufficiently to assure that no objectional noise is present at the receiver output. From the foregoing description, therefore, it has been shown that the gain of amplifier stage 1 may be made very low either when no carrier signal is present or when the carrier signal is present but below a predetermined threshold value.

In most conventional receivers an automatic volume control signal is developed when an incoming carrier signal is received. This automatic volume control signal or any other control signal representative of an incoming carrier may be utilized to increase the gain of the amplifier stage 1 whenever the incoming carrier exceeds a predetermined threshold. This is accomplished in the squelch circuit of this invention by applying the control signal to the tunnel diode device at terminals 17 to cause switching thereof from a high impedance condition, as shown at point 1 in FIG. 5, to a low impedance condition as shown at point 2 thereof. The control signal applied to terminals 17 is of a polarity to reduce the net bias on tunnel diode 13. When the net bias has been reduced to a value such that the intersection of load line A with the tunnel diode current-voltage characteristic is near the point D, tunnel diode 13 almost instantly switches to the lower impedance condition. The magnitude of the control signal in excess of that necessary to cause switching is effective to further reduce the net bias on tunnel diode 13 to achieve an operating condition such as shown at the point 2. Any further reduction in bias such as might be caused by a strong incoming carrier producing a large control signal moves the operating point further downward along the characteristic, however, the impedance remains at a low value.

With the abrupt change in the operating condition of tunnel diode 13, there is an abrupt lowering of the equivalent resistance in series with the resonant load circuit of amplifier 1. For example, the equivalent resistance with tunnel diode 13 in its low impedance operating condition is appreciably less than when the tunnel diode 13 is in the high impedance condition. Since the circuit "Q" is $$\frac{\omega L}{R}$$

the smaller series resistance increases the circuit "Q" to produce an abrupt increase in the gain of the amplifier. It may be seen, therefore, that there is a substantial variation in the gain of the amplifier stage caused by the change in the operating condition of the tunnel diode device. Since this change in operating condition takes place almost instantly the variation in amplifier gain is abrupt and positive.

As described hereinbefore, an increase in the magnitude of the control signal above that required to produce switching changes the position of the operating point but maintains the low impedance operating condition of the tunnel diode device. The tunnel diode device 13 remains in a low impedance condition until the control signal is absent or is so weak that the net bias on the tunnel diode causes the intersection of the load line A to move above the knee of the current-voltage characteristic, at which point the operating condition of the tunnel diode 13 abruptly changes to the high impedance condition in the vicinity of the point 1. There is no area of indecision, therefore, either due to extremely strong or extremely weak incoming carrier signals. The gain of the amplifier stage is appreciably changed only when the tunnel diode device is caused to switch from one operating condition to another. There is a wide operating range which may be provided by appropriate selection of load line slope and quiescent high impedance operating condition. For example, the tunnel diode may be made to switch from its high to its low impedance condition with small magnitude or large magnitude control signals, as desired, thereby establishing the selected threshold value of the incoming carrier signal.

As described hereinbefore, resistance 16 establishes a direct current load line of suitable slope to assure switching, determines in large part the level of control signal required, and, in combination with the impedance of tunnel diode 13, provides the equivalent resistance in series with the resonant circuit. Since it is the change in this equivalent resistance which causes the resulting change in the gain of the associated amplifier, it is desirable that it have a large value at the quiescent operating condition. By a suitable selection of resistance 16, the equivalent resistance may be made large enough at the quiescent operating condition to provide for an appreciable variation in the gain of the associated amplifier when the operating condition of the tunnel diode device is changed.

For a given tunnel diode device having a particular peak current, there is a certain value of resistance 16 to provide a maximum gain variation. This value of resistance 16, however, may require too large a control signal to achieve switching. In addition, the maximum gain variation may still not be as large as desired. For some applications, therefore, it is desirable to provide for a still greater variation in gain between the two operating conditions while at the same time allowing the circuit to be switched from the low to the high gain condition by a small control signal. One way of increasing the gain variation is by the substitution of a tunnel diode device having a lower peak current. This allows resistance 16 to have a larger value while at the same time fulfilling its other requirements. This is not always feasible, however, and some other approach is often desirable.

In FIG. 6 there is shown another embodiment of the present invention which provides for a wider range of gain ratios between the two operating conditions while at the same time allowing for switching by low level control signals. This is accomplished by an additional impedance 20 connected between resistance 16 and tunnel diode 13. Impedance 20 is adapted to provide a low resistance to direct current but a higher impedance at the signal frequency. "Signal frequency" as used herein refers to the frequency of the signal applied to the input of the associated amplifier stage.

In FIG. 6 impedance 20 is provided by inductance 21 and capacitance 22 in parallel circuit relationship. The parallel combination of inductance 21 and capacitance 22 is made resonant to the signal frequency. At the signal frequency, therefore, impedance 20 has a value corresponding to the high resonant impedance of the parallel combination of inductance 21 and capacitance 22 while at direct current its value is the relatively low resistance of inductance 21. The additional impedance 20 may be provided by inductance 21 alone, in many instances, in which case it is chosen to provide a suitable reactance at the signal frequency.

Since the direct current resistance of impedance 20 is relatively low, the direct current characteristics of the circuit are substantially the same as in the case of the circuit arrangement of FIG. 3 which has been described fully above. At the signal frequency the maximum value of the equivalent resistance between the points 18 and 19, however, is no longer limited by the maximum value of resistance 16. For example, whereas in the circuit of FIG. 3 the equivalent resistance between points 18 and 19 is due to the parallel combination of resistance 16 and the impedance of tunnel diode 13, in the embodiment of FIG. 6 the equivalent resistance is due to the series combination of resistance 16 and impedance 20 in parallel with the tunnel diode impedance. It is evident, therefore, that impedance 20 operates to provide a larger equivalent resistance between the points 18 and 19 without appreciably altering the direct current characteristics of the circuit. Resistance 16 may be selected to provide for switching by a low level control signal without limiting the equivalent resistance between the points 18 and 19 to a value which does not allow as large a variation in gain as may be desired. Since impedance 20 does not alter the D.C. characteristics, it is possible to provide for a very large variation in gain if desired. Any value of impedance 20, however, increases the variation in gain from that which is possible from the embodiment of FIG. 3 which does not employ such additional impedance.

When a negative resistance type tunnel diode device is employed with the embodiment of FIG. 6, there is a possibility that the combination of resistance 16, impedance 20 and the impedance of tunnel diode 13 may provide an equivalent resistance between the points 18 and 19 which is negative. Since impedance 20 is connected across tunnel diode 13, oscillations will be produced if impedance 20 in series with resistance 16 exceeds the absolute value of this negative resistance. This may not be desirable since such oscillations may interfere with the dependable switching of tunnel diode 13. When required, therefore, an additional resistance, shown in phantom at 23, may be connected as shown either across inductance 21 or tunnel diode 13 to prevent such oscillations. Resistance 23 is selected to assure that the equivalent resistance due to the combination of resistance 16, impedance 20 and the tunnel diode impedance is always positive. In addition, resistance 23 is selected to assure that the equivalent resistance at the quiescent operating condition is large enough to provide the desired variation in gain. The above embodiment provides for a wide range of gain ratios as well as a wide range of control signal levels for any given tunnel diode device.

One circuit constructed in accordance with the embodiment of FIG. 3 of this invention utilized the following circuit parameters, which are given by way of example only:

| | |
|---|---|
| Tunnel diode 13 | Germanium negative resistance type tunnel diode device having a peak current of 0.5 milliamp. |
| Voltage source 14 | 1.5 volt battery. |
| Resistance 15 | 2500 ohms. |
| Resistance 16 | 500 ohms. |
| Inductance 10 | 820 microhenries. |
| Capacitance 11 | 150 micromicrofarads. |

With an input signal to the associated amplifier having a frequency of about 450 kilocycles the change in gain between the two operating conditions is about 10 db.

Another circuit constructed in accordance with the embodiment of FIG. 6 utilized the following circuit parameters which are, as before, given by way of example only:

| | |
|---|---|
| Tunnel diode 13 | Germanium negative resistance type tunnel diode device having a peak current of 0.5 milliamp. |
| Voltage source 14 | 1.5 volt battery. |
| Resistance 15 | 2900 ohms. |
| Resistance 16 | 750 ohms. |
| Inductance 21 | 1 millihenry. |
| Capacitance 22 | 125 micromicrofarads. |
| Capacitance 11 | 150 micromicrofarads. |
| Inductance 10 | 820 microhenries. |

With an input signal to the associated amplifier having a frequency of about 450 kilocycles the change in gain is about 30 db.

While only preferred features of the invention have been shown by way of illustration, many modifications and changes will occur to those skilled in the art and it is, therefore, to be understood that the appended claims are intended to cover all such modifications and changes as fall within the true spirit and scope of this invention.

What I claim as new and desire to secure by Letters Patent of the United States is:

1. In a squelch circuit for a receiver of carrier waves including at least one amplifier stage having a resonant load circuit, the combination with said amplifier stage of a tunnel diode device capable of operation in a high and a low impedance condition; means connecting said tunnel diode device in series with the resonant load circuit of said amplifier stage; means in circuit with said tunnel diode biasing said diode for operation in its high impedance condition; and means for applying a signal to said tunnel diode to change the operating condition thereof.

2. In a squelch circuit for a receiver of carrier waves including at least one amplifier stage having a resonant load circuit, the combination with said amplifier stage of a tunnel diode device capable of operation in a high and a low impedance condition; means connecting said tunnel diode device in series with the resonant load circuit of said amplifier stage; bias means in circuit with said tunnel diode device providing operation therefor in its high impedance condition; and means for applying a signal derived from the received carrier wave to said tunnel diode device reducing the bias on said tunnel diode and changing its operating condition.

3. A squelch circuit comprising: a circuit branch parallel resonant to a selected frequency; means for applying an input signal to said circuit branch having a frequency near said selected resonant frequency; a tunnel diode device capable of operation in a high and a low impedance condition; means connecting said tunnel diode in series with said resonant circuit branch; bias means in circuit with said tunnel diode providing operation therefor in its high impedance condition; and means for applying a control signal to said tunnel diode lowering the bias thereon and changing the operating condition thereof from said high impedance to said low impedance condition whereby the "Q" of said resonant circuit branch is abruptly changed from a low to a high value.

4. In a squelch circuit for a receiver of carrier waves including at least one amplifier stage having a resonant load circuit, the combination with said amplifier stage of a tunnel diode device having a first and second operating condition; means connecting said tunnel diode in series with said resonant load circuit; circuit means including an impedance having a low resistance at direct current and a higher impedance at the frequency of the amplifier input signal connected across said tunnel diode; means for connecting a source of direct current voltage to said circuit means to provide that the equivalent resistance in series with said resonant load circuit is larger at said first than at said second tunnel diode operating condition; and means for applying a control signal derived from an incoming carrier wave to said tunnel diode for changing the operating condition thereof.

5. The squelch circuit of claim 4 wherein the impedance included in said circuit means is an inductance and capacitance combination parallel resonant to the frequency of said amplifier input signal.

6. In a squelch circuit for a receiver of carrier waves including at least one amplifier stage having a resonant load circuit, the combination with said amplifier stage of a tunnel diode device having a first and second operating condition; means connecting said tunnel diode in series with said resonant load circuit; circuit means including an impedance having a low resistance at direct current and a higher impedance at the frequency of the amplifier input signal connected across said tunnel diode; means for connecting a source of direct current voltage to said circuit means to provide that the equivalent resistance in series with said resonant load circuit is always positive and larger at said first than at said second tunnel diode operating condition; and means for applying a control signal derived from an incoming carrier wave to said tunnel diode for changing the operating condition thereof.

References Cited in the file of this patent

UNITED STATES PATENTS

| | | |
|---|---|---|
| 1,896,173 | Hentschel | Feb. 7, 1933 |
| 2,774,866 | Burger | Dec. 18, 1956 |